United States Patent

Froio

[15] 3,655,021
[45] Apr. 11, 1972

[54] IMBALANCED BRAKING DEVICE

[72] Inventor: Nicholas J. Froio, Harvey, Ill.
[73] Assignee: Froio Corporation, Harvey, Ill.
[22] Filed: Nov. 23, 1970
[21] Appl. No.: 91,934

[52] U.S. Cl. ..........................193/35 A, 74/411.5, 188/180, 193/37
[51] Int. Cl. ................B60t 8/04, B65g 13/00, B65g 13/075
[58] Field of Search ..............74/411.5, 752 F; 188/180, 290; 193/35 A, 37

[56] References Cited

UNITED STATES PATENTS

| | | | |
|---|---|---|---|
| 1,277,127 | 8/1918 | Rogers | 74/752 F |
| 1,525,070 | 2/1925 | Coleman | 74/752 F |
| 2,142,310 | 1/1939 | Hagenbook | 188/180 |
| 3,312,320 | 4/1967 | Froio | 193/35 A |
| 3,314,514 | 4/1967 | Hundhausen et al. | 193/35 A |

Primary Examiner—Evon C. Blunk
Assistant Examiner—W. Scott Carson
Attorney—Pendleton, Neuman, Williams & Anderson

[57] ABSTRACT

This braking device for retarding moving objects such as a pallet on a gravitationally-actuated conveyor system comprises a housing and a gear train or equivalent supported by the housing, including at least a first gear and a terminal gear and preferably an intermediate gear intermeshed so as to progressively increase angular velocity as the first gear is rotated. At least the terminal gear in the gear train is substantially imbalanced about the rotational axis thereof whereby rotational resistance increases as angular velocity increases. Means are also provided for translating the movement of the moving objects into rotational movement of the first gear so that the forces to rotate the gear train, including the imbalanced last gear, act to retard the moving object. In specific embodiments, the imbalance of the last gear is obtained by selectively removing material from a portion thereof, by selectively adding weight thereto or a combination of both.

15 Claims, 9 Drawing Figures

PATENTED APR 11 1972          3,655,021

INVENTOR
NICHOLAS J. FROIO
BY Pendleton, Neuman, Williams & Anderson
ATTORNEYS

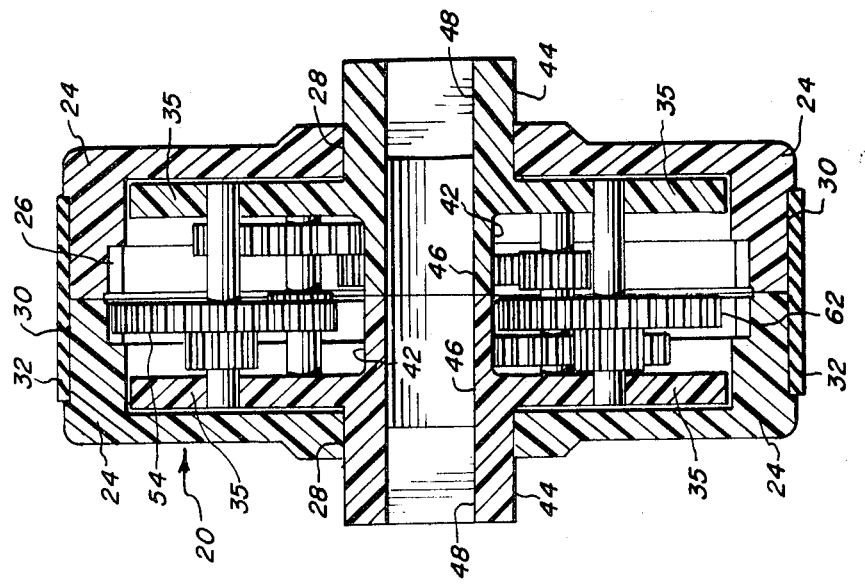
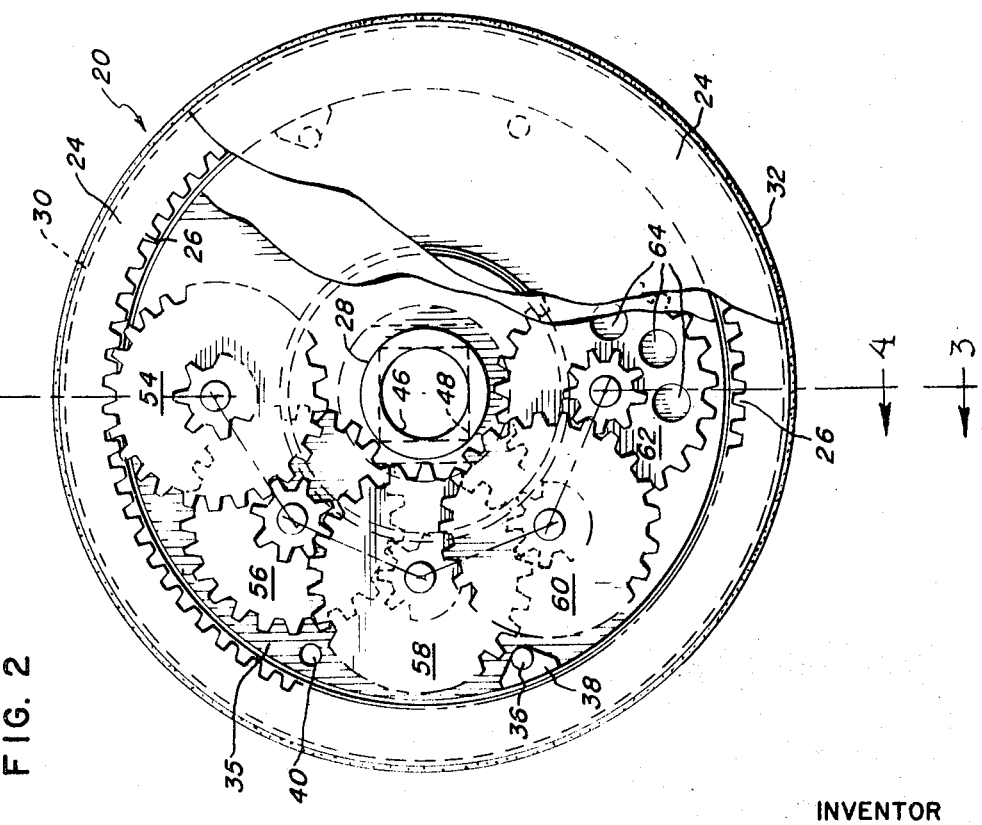

INVENTOR
NICHOLAS J. FROIO
BY Pendleton, Neuman, Williams & Anderson
ATTORNEYS

3,655,021

IMBALANCED BRAKING DEVICE

BACKGROUND OF THE INVENTION

1. Field of the Invention

This invention relates to a braking or retarding device which slows down or otherwise controls the speed of moving objects such as a pallet on a gravitationally-actuated conveyor system. More specifically, it relates to a low-cost, simplified braking device for conveyors and the like which does away with the complex mechanisms associated with centrifugally-actuated brakes of the prior art and substitutes therefor a simple gear train or equivalent with an imbalanced terminal gear or rotor.

While the present invention will be described with particular reference to embodiments designed primarily for braking or retarding objects gravitationally flowing on conveyor systems, it should be understood that the use of the invention is not limited thereto. It can be employed for braking, retarding, restraining, governing or otherwise controlling the movement of many other objects, including, for example, controlled-fall fire escape systems, automobile safety harnesses and belts, and the like.

2. Description of the Prior Art

A variety of retarding devices have been designed to control the speed of moving objects, particularly articles whose movement is induced by gravity. Generally, these devices here involved elaborate speed-reduction gear trains driven by a rotatable cylinder or wheel which is responsive to the movement of an article. Typically, the gear trains terminate at the last gear with a brake which is centrifugally responsive in its operation.

Typical of such devices are the brakes disclosed in certain of the patents classified in Class 188, subclass 187 and Class 193, subclass 35 of the "Manual of Classification of Patents" of the U.S. Patent Office, including the various prior-art brakes discussed in such patents. These prior-art brakes, however, suffer from one or more shortcomings. Some, for example, are structurally complicated, difficult to assemble, or are otherwise complex in operation. Some do not lend themselves to inexpensive manufacture. Some can not be fabricated entirely from plastic. Some are not characterized by flexibility in their application or in the amount of retardation forces. Still others do not lend themselves to miniaturization.

OBJECTS OF THE INVENTION

It is therefore a general object of the present invention to cope with these and other problems associated with prior-art devices. It is another general object to provide a retarding or braking device which is simple in construction, versatile in its application and inexpensive to manufacture.

It is a more specific object to provide a lowcost braking device which lends itself to miniaturization. It is another specific object to provide a braking device which can readily be adapted to provide a wide range of braking forces. It is another specific object to provide a braking device which can be fabricated from a minimum number of differing components and, if desired, can be produced entirely from plastic materials. It is another object to provide an inexpensive braking device which is devoid of springs in the braking mechanism itself and requires no moving parts other than rotatably mounted gear trains.

It is still another specific object to provide a speed-retarding device which can be installed singly or in multi-unit installation whereby the retarding forces are multiplied as desired. These and other objects will be apparent as the detailed description thereof proceeds.

SUMMARY OF THE INVENTION

These objects are achieved in a particular embodiment by a braking device comprising a housing and a particular type of gear train supported by the housing. The gear train comprises a plurality of rotatably mounted gears including at least a first gear and a last or terminal gear and preferably one or more intermediate gears, all intermeshed so as to progressively increase the angular velocity of each successive gear as the first gear in the train is rotated. It is essential that one or more of the terminal gears in the gear train be substantially imbalanced whereby retarding forces are generated as the imbalanced gear or gears are rotated at high angular speeds. Means are also provided for translating the movement of the object to be retarded into rotational movement of the first gear. Typical means include rollers, wheels, and the like, which are preferably resiliently mounted and are rotated by frictional engagement with the moving object, the rotation being transmitted by direct axial coupling or otherwise to the first gear. The forces required to rotate the gear train including the imbalanced terminal gear or gears thus act to retard the movement of the object.

Imbalancing the terminal gear or gears is readily accomplished by, for example, selectively removing a portion of the material making up the gear, adding weights thereto or removing and substituting other materials. In one embodiment, imbalance is simply and effectively achieved by drilling holes at selected asymmetrical locations adjacent the periphery of the terminal gears. In another embodiment, apertures in the terminal gear or gears are filled with lead weights. This serves the dual purpose of increasing the mass to be angularly accelerated and also imbalancing the gear, both factors increasing the retarding forces.

At low speeds the gear train provides only the normal frictional retarding forces as supplemented by the forces required to accelerate the gear components. At higher rotational speeds, however, the imbalance of the last gear and, in certain embodiments, intermediate gears, produces sharply increased braking forces. The exact nature of these increased forces are not generally understood but it is believed that the imbalance causes both increased bearing friction as well as tooth-to-gear friction of the gears. Some energy may also be dissipated in vibratory motion of the assembly caused by the imbalance.

In a preferred embodiment the device is fabricated in cylindrical form with the gear train internally housed. The motion of the object to be retarded may be imparted directly to the outer housing and then to the first gear by means of a planetary gearing arrangement. It may also be translated to the first gear by means of a variety of direct or indirect axle drives, as will be apparent from the drawings hereinafter.

The braking device may be fabricated from a variety of materials, e.g., steel, aluminum, magnesium and various powdered metal or plastics or combinations thereof. In a preferred embodiment the entire braking device is fabricated from high-strength, high-impact plastic materials which may or may not contain fibrous reinforcement such as glass fibers and may or may not be self-lubricating. Thus, for example, the components may be fabricated from high strength nylon polyamide resins having added thereto molybdenum disulfide. A suitable commercial version is NYLATRON GS nylon sold by The Polymer Corporation. Other suitable materials include, for example, such synthetic resins as DELRIN acetal resin and ZYTEL nylon resin, both sold by E. I. du Pont de Nemours & Co. Different components may be fabricated from different materials to meet particular requirements and minimize cost.

BRIEF DESCRIPTION OF THE DRAWINGS

The present invention will be more clearly understood from the following detailed description of specific embodiments, read in conjunction with the accompanying drawings, wherein:

FIG. 2 is a cutaway elevation view of one of the braking devices of FIG. 1;

FIG. 3 is a section view taken on the line 3—3 of FIG. 2;

Figure 1:
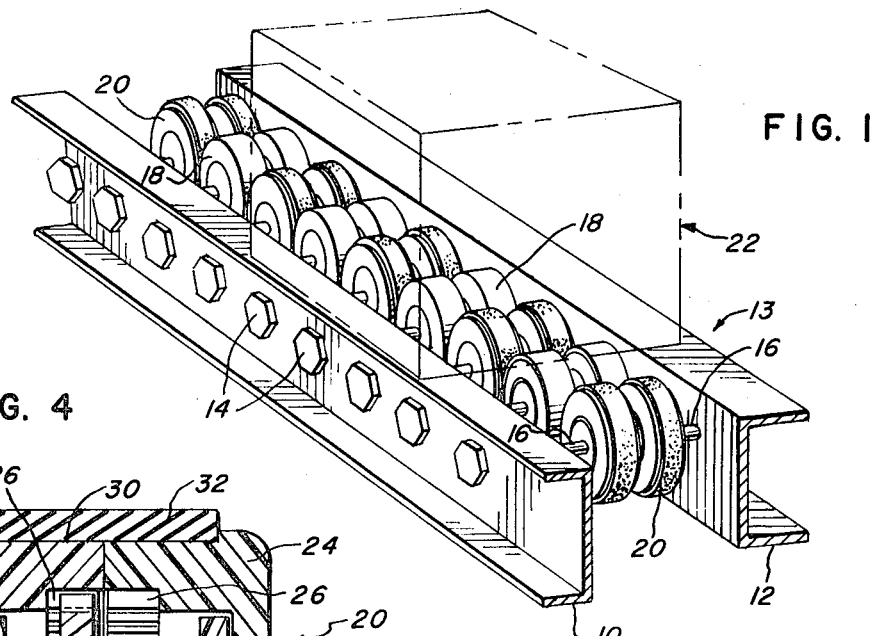
FIG. 1 is a fragmentary perspective view of a portion of a "skate wheel" conveyor wherein a plurality of the braking devices of the present invention have been substituted for certain of the "skate wheels"

It should be understood that the specific embodiments illustrated in the drawings are not necessarily to scale and that certain portions thereof are represented by graphic symbols or have been omitted for simplicity of illustration. As a result, the representations may depart in certain respects from the actual appearance without detracting from the essential information communicated to those skilled in the art.

DETAILED DESCRIPTION OF THE DRAWINGS, INCLUDING PREFERRED EMBODIMENTS

REferring to FIG. 1, U-shaped channels 10 and 12 of conveyor 13 are secured in spaced relation by bolts 14 which pass through spacer sleeves 16. Mounted on the shafts formed by bolts 14 and spacers 16 are skate wheel rollers 18 and a plurality of braking devices 20 of the present invention.

The fragmentary section of conveyor 13 portrayed in FIG. 1 represents only a small portion of a much longer, gravitationally-actuated conveyor system. As the article being conveyed thereby, such as suggested by the box outline 22, moves along the conveyor gravitationally, it tends to pick up speed which could cause damage when successive boxes collide or stop in the conveyor is encountered. The article can, however, be slowed down or otherwise retarded by inserting the braking devices of the present invention at appropriate intervals.

In FIG. 1 the braking devices are installed on every second shaft. Alternatively, they could be installed on every shaft or at any other desired interval. Further, only one device need be installed on each shaft. The number and spacing of the braking devices will depend upon the particular installation, taking into account such variables as the weight and bulk of the moving objects on the conveyor, the fragility of the moving objects, the incline of the conveyor, the braking forces available from each braking device, and the like.

Figure 4:
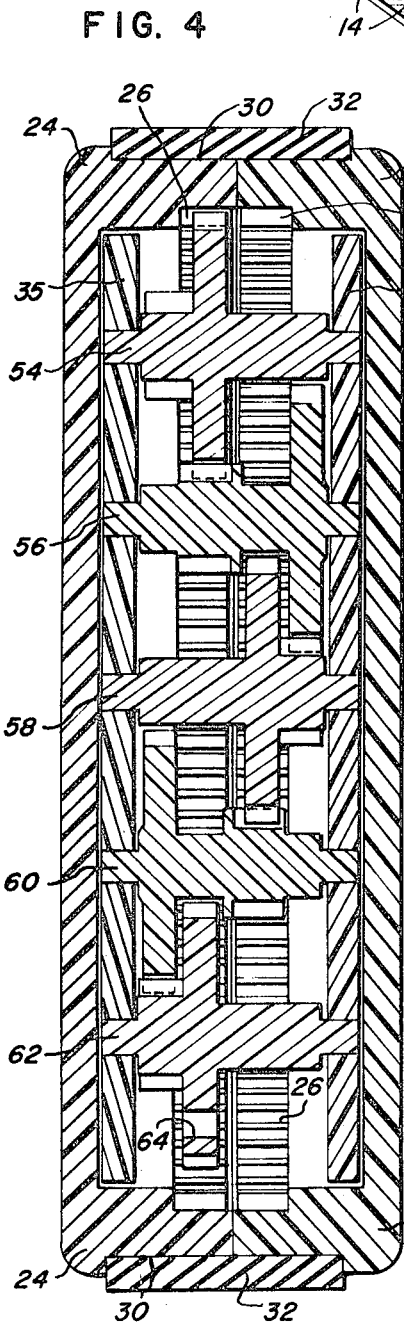
FIG. 4 is an enlarged section view taken on the line 4—4 of FIG. 3, a portion of the section line 4—4 being semi-circular so as to pass through the axes of rotation of the gears in the gear train.

Referring to FIGS. 2 through 4, braking device 20 comprises an outer housing made up of two identical half sections 24 which are designed to be secured together with the internal planetary gear teeth 26 adjacent one another. The two half sections 24 have an axial bore 28 and a peripheral indentation 30 into which is fitted a rubber or similar resilient non-skid band 32 which is under slight tension.

The half sections 24 are molded with alternate pins or dowels and holes whereby two half sections can be meshed to form an integral housing. The two half sections can be cemented in place, as desired. The use of two identical half sections minimizes molding costs.

As will be apparent hereinafter, the planetary gear teeth on only one half section of the two are actually engaged by the gear train. Thus the other half section can be molded without gear teeth, if desired. As a practical matter, however, it is less costly from a molding standpoint to use identical half sections. An additional advantage is that it reduces the possibility of mistakes in assembly.

Figure 5A:
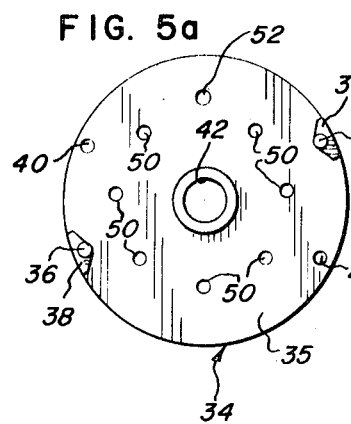
FIGS. 5a and 5b are front and side elevation views on a reduced scale of the gear retainer housing employed in the braking device of FIGS. 1-4.
Figure 5B:
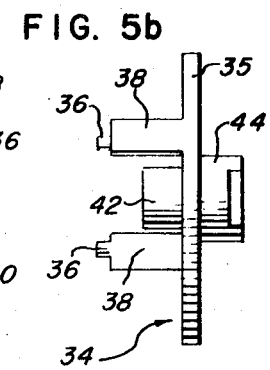

Inside the housing formed by sections 24 is disposed a gear retainer made up of two identical half sections 34, one of the half sections being shown in FIGS. 5a and 5b. The use of two identical half sections 34 to form the gear retainer again results in substantial molding economies. The identical half sections are designed to interfit with the complementary circular plates 35 thereof in spaced relationship. Thus, pins 36 on spacers 38 fit into apertures 40 on the complementary half section.

The gear retainer 34 has an internal axial protrusion 42 and an external axial protrusion 44. The external protrusion 44 extends through axial bore 28 in housing half sections 24 and is rotationally supported thereby.

Protrusions 42 and 44 are in axial alignment and have an axially-coincident bore. The inner bore 46 is cylindrical whereas the outer bore 48 has a square configuration. Thus, gear retainer 34 can be non-rotationally secured by mounting the same on a stationary shaft having a square cross section which interfits with the square configuration of the outer bore. As will become apparent hereinafter, relative rotational movement of the outer housing with respect to the gear retainer results in rotation of the gear train supported by the gear retainer.

The gear retainer 34 has a series of inward bushing apertures 50 and a single outward bushing aperture 52. These bushing apertures rotatably support the individual compound or composite gears 54, 56, 58, 60 and 62 which comprise the gear train in this particular embodiment. The inward bushing apertures which support gears 56, 58, 60 and 62 are disposed so that the gears do not mesh with the planetary gear teeth 26 of half sections 24. In contrast, the outward bushing aperture 52 is disposed so that gear 54 does mesh with planetary gear teeth 26. As can be seen in FIGS. 2 and 4, the gear train is such that as the outer housing is rotated by contacting the moving object with the gear retainer stationarily secured, the internal gears 54, 56, 58, 60 and 62 are each in turn rotated at successively higher rotational velocities.

To increase the rotating forces or "drag" as angular velocities increase, gear 62 is imbalanced by drilling therein a series of asymmetrically disposed holes 64. The forces created by this imbalance, when transmitted back to the planetary gear of half sections 24, result in a substantial braking force which progressively increases as angular velocity increases.

While only five gears are shown in the gear train of braking device 20, there may be as many as eight gears in the gear train, if desired or necessary to achieve the desired braking forces. Similarly, fewer gears than five may be employed. Also, more than one gear may be imbalanced. The particular braking forces for a particular braking device may be indicated by color coding housing sections 24.

Manifestly, neither the first gear nor the last gear in the gear train, i.e., gears 54 and 62, respectively, need be compound gears since only one gear is intermeshed. As a matter of production convenience, however, compound gears are employed so that a separate mold need not be devised for the same. As is apparent from FIGS. 2 and 4, only two different types of compound gears are required for the gear train, resulting in production economies. Gear 62 is imbalanced by the simple expedient of drilling holes in the outer portion of one of the two types of gears.

Figure 6:
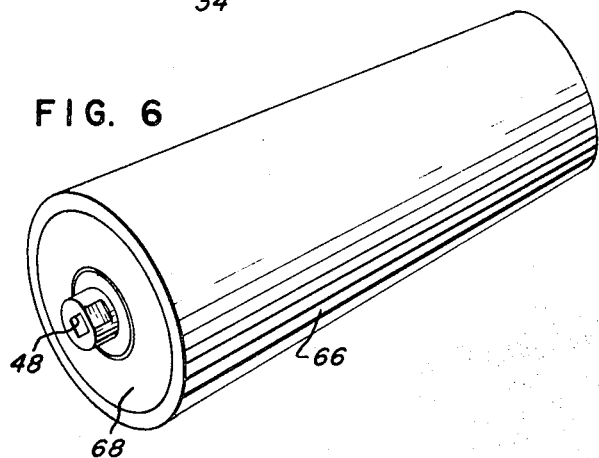
FIG. 6 is a perspective view of an elongated, hollow cylindrical conveyor roller with the braking device of FIGS. 1-5 press fitted into the ends thereof to convert the roller into a braking roller.

A unique feature of the embodiment of FIGS. 1-5 is that in addition to being a "skate wheel" brake it can also be employed as a braking device in a braking roller. This is illustrated in FIG. 6 wherein roller 66 represents a hollow cylindrical conveyor roller. Two braking devices of the type described in connection with FIGS. 1-5 are force fitted into the respective ends of roller 66, one of them being indicated by reference numeral 68. For such purposes, band 32 and one of the edges forming recess 30 are removed so that the other edge abuts the end of roller 66.

Figure 7:
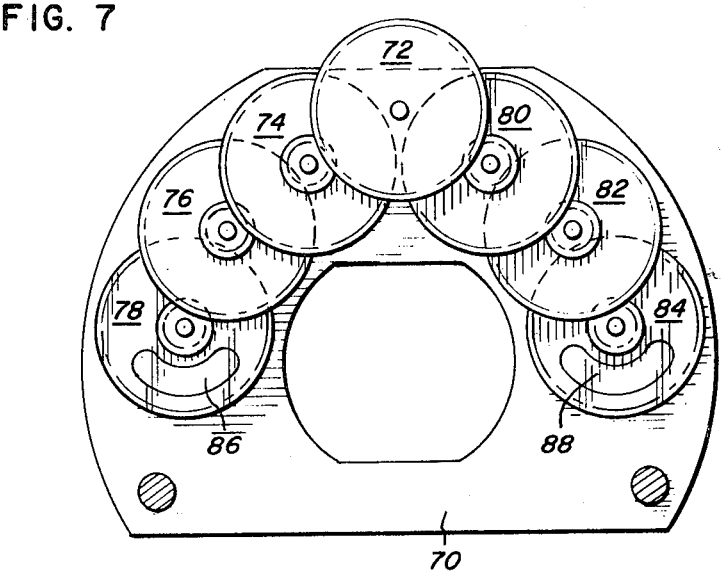
FIG. 7 is an elevation view in section of an alternative gear retainer and gear arrangement.

Another embodiment of gear retainer and gear system which may be employed as the internal braking system for a skate wheel braking device is illustrated in FIG. 7. This device can be accommodated inside an outer housing such as is employed in the embodiment of FIGS. 1 through 5. It comprises gear retainer 70 (only half of which is shown in this section view), outer gear 72 and driven gears 74, 76, 78, 80, 82 and 84.

The embodiment of FIG. 7 differs from the embodiment of FIGS. 1–5 primarily in that gear 72, which meshes with the planetary gear of the outer housing, drives two gear trains comprising gears 74, 76 and 78 and 80, 82 and 84, respectively, rather than one. The load on the gear teeth of gear 72 is thus distributed over several teeth whereby brakeage is minimized. Also, gears 78 and 84 of the respective gear trains are imbalanced by drilling out a portion thereof and securing weights 86 and 88 therein, respectively.

Figure 8:
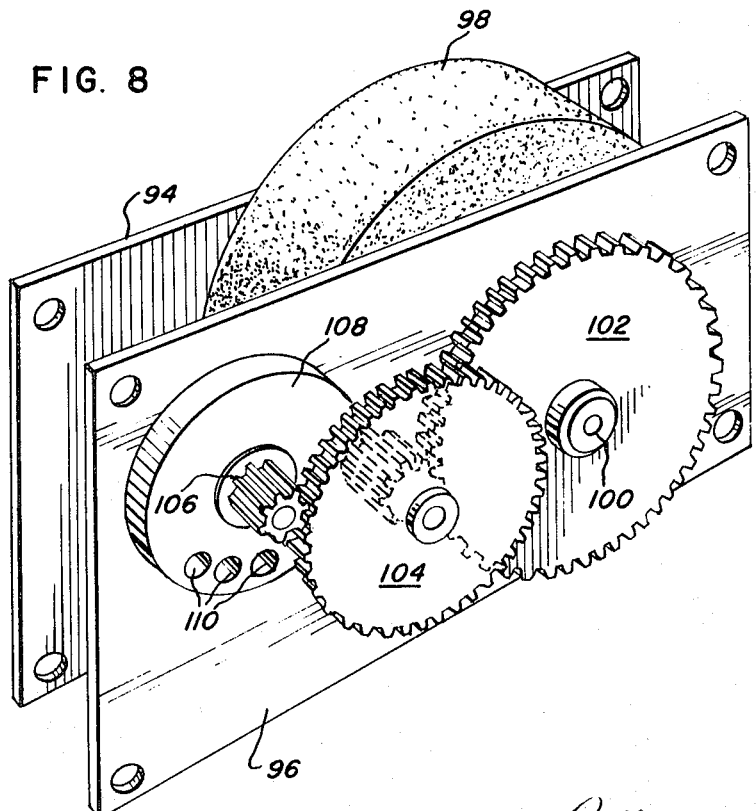
FIG. 8 illustrates still another embodiment of the braking device of the present invention with a substantial portion of the housing removed to show essential aspects of the interior.

Still another embodiment is illustrated in FIG. 8, wherein substantial portions of the housing have been removed for purposes of illustration. The embodiment comprises housing plates 94 and 96 between which contact roller or wheel 98 is supported on, and keyed to, an extension of shaft 100. Shaft 100 is rotatably supported in aligned bushings (not shown) in plates 94 and 96. Also keyed to shaft 100 is gear 102 which intermeshes with compound gear 104 which in turn intermeshes with gear 106. The shafts on which gears 104 and 106 are rotatably supported are secured to plate 96 and an outer plate which is not shown in this drawing. Gear 106 is imbalanced by securing thereto cylindrical disc 108 having asymmetrical apertures 110 therein.

As wheel 98 contacts the moving object and is rotated, the rotational action is transmitted via shaft 100, gear 102 and gear 104 to gear 106 with imbalanced disc 108. As rotation velocity increases, the braking action from the imbalanced load increases.

The outer portion of wheel 98 preferably comprises an annular member formed of rubber or similar resilient material. The braking device may be resiliently mounted on a conveyor system in a manner similar to that illustrated in FIGS. 5 and 6 of U.S. Pat. No. 3,314,514.

From the above description and drawings, it is apparent that the objects of the present invention have been achieved. While only certain embodiments have been described or illustrated, many alternative modifications and equivalents will be apparent from the above description to those skilled in the art.

For example, while the embodiments set forth herein employ a gear train to transmit the rotational movement, it is to be understood, of course, that the invention is not limited thereto. Equivalent operative means may be substituted, such as frictional contacting surfaces, chain and sprocket, belt and pulley, rack and pawl, and combinations thereof and the like. These and other alternatives and equivalents are considered within the spirit and scope of the present invention and coverage thereof is intended by the claims of any patents based on this application and any continuations or divisions thereof, even though not necessarily encompassed by the strict verbiage thereof.

Having described the invention, what is claimed is:

1. A braking device for retarding moving objects comprising in combination:
    a. a housing;
    b. a gear train supported by said housing, said gear train comprising a plurality of rotatably-mounted gears, including at least a first gear and a terminal gear, intermeshed so as to progressively increase the angular velocity as the first gear in the train is rotated, at least the last gear in said gear train being substantially imbalanced about the rotational axis thereof; and
    c. means for translating the movement of said moving objects into rotational movement of said first gear whereby the forces to rotate said gear train including the imbalanced last gear act to retard the movement of said moving objects.

2. The braking device of claim 1 including an intermediate gear in the gear train.

3. The braking device of claim 2 including at least one imbalanced intermediate gear in the gear train.

4. The braking device of claim 1 including a plurality of intermediate gears in the gear train.

5. The braking device of claim 1 wherein said housing is circular and concentrically-mountable within an outer circular housing having a common axis and inwardly-directed gear teeth in intermeshing and planetary relationship with the gear teeth of said first gear.

6. The braking device of claim 5, including a resilient band affixed to the periphery of said outer circular housing.

7. The braking device of claim 1 including a plurality of gear trains supported by said housing, and wherein said means translates the movement of said moving object into rotational movement of the first gear of each gear train.

8. The braking device of claim 1 including a plurality of gear trains supported by said housing and having a common first gear.

9. The braking device of claim 1 fabricated from high-strength synthetic resins.

10. The braking device of claim 9 wherein at least a portion of said resins are self-lubricating.

11. The braking device of claim 1 wherein said last gear is selectively apertured to imbalance the same.

12. The braking device of claim 1 wherein said last gear is selectively weighted to imbalance the same.

13. The braking device of claim 1 in combination with a gravitationally-actuated conveyor track wherein said means for translating the movement of said moving object into rotational movement of said first gear comprises a roller disposed to be frictionally engaged by the moving object and rotated thereby, said roller operatively engaging said first gear whereby to rotate the same.

14. The braking device of claim 1 wherein said means for translating the movement of said moving object comprises a resiliently mounted wheel in the path of movement of said moving object and disposed to be rotated thereby, said rotation being translated to said first gear.

15. The braking device of claim 1 mounted within a cylindrical conveyor roller whereby the rotation of the roller is imparted to said first gear.

* * * * *